(12) United States Patent
Addink et al.

(10) Patent No.: US 6,892,113 B1
(45) Date of Patent: May 10, 2005

(54) IRRIGATION CONTROLLER USING REGRESSION MODEL

(75) Inventors: John Addink, Riverside, CA (US); Sylvan Addink, Iowa City, CA (US)

(73) Assignee: Aqua Conserve, Inc., Riverside, CA (US)

( * ) Notice: Subject to any disclaimer, the term of this patent is extended or adjusted under 35 U.S.C. 154(b) by 0 days.

(21) Appl. No.: 10/009,867

(22) PCT Filed: Jul. 7, 2000

(86) PCT No.: PCT/US00/18705

§ 371 (c)(1),
(2), (4) Date: Dec. 11, 2001

(87) PCT Pub. No.: WO02/05045

PCT Pub. Date: Jan. 17, 2002

(51) Int. Cl.[7] .................................................. G05D 7/00
(52) U.S. Cl. .................. 700/284; 700/283; 137/624.11; 239/64; 239/69
(58) Field of Search .............................. 137/78.2, 78.5, 137/624.11; 239/1.11, 14.1, 63, 64, 67, 69; 340/601; 700/282, 283, 284

(56) References Cited

U.S. PATENT DOCUMENTS

| | | | |
|---|---|---|---|
| 5,097,861 A | 3/1992 | Hopkins et al. | 137/78.3 |
| 5,208,855 A | 5/1993 | Marian | 380/9 |
| 5,696,671 A | 12/1997 | Oliver | 364/140 |
| 5,839,660 A * | 11/1998 | Morgenstern et al. | 239/63 |
| 5,870,302 A * | 2/1999 | Oliver | 700/11 |
| 6,453,216 B1 * | 9/2002 | McCabe et al. | 700/284 |
| 2003/0109964 A1 * | 6/2003 | Addink et al. | 700/284 |

* cited by examiner

Primary Examiner—Leo Picard
Assistant Examiner—Carlos R. Ortiz-Rodriguez
(74) Attorney, Agent, or Firm—Rutan & Tucker

(57) ABSTRACT

The present invention provides systems and methods in which an irrigation controller uses a regression model to estimate an evapotranspiration rate (estimated ETo), and uses the estimated ETo to affect an irrigation schedule executed by the controller. The regression model is preferably based upon a comparison of historical ETo values against corresponding historical environmental values, with the data advantageously spanning a time period of at least one month, and more preferably at least two months. Data for multiple environmental factors may also be used. The environmental factor(s) utilized may advantageously comprise one or more of temperature, solar radiation, wind speed, humidity, barometric pressure, and soil moisture. Values relating the environmental factor(s) may enter the controller from a local sensor, a distal signal source, or both.

14 Claims, 7 Drawing Sheets

IRRIGATION CONTROLLER USING REGRESSION MODEL

FIELD OF THE INVENTION

The field of the invention is irrigation controllers.

BACKGROUND OF THE INVENTION

Many irrigation controllers have been developed for automatically controlling application of water to landscapes. Known irrigation controllers range from simple devices that control watering times based upon fixed schedules, to sophisticated devices that vary the watering schedules according to local geography and climate conditions.

With respect to the simpler types of irrigation controllers, a homeowner typically sets a watering schedule that involves specific run times and days for each of a plurality of stations, and the controller executes the same schedule regardless of the season or weather conditions. From time to time the homeowner may manually adjust the watering schedule, but such adjustments are usually only made a few times during the year, and are based upon the homeowner's perceptions rather than the actual watering needs. One change is often made in the late Spring when a portion of the yard becomes brown due to a lack of water. Another change is often made in the late Fall when the homeowner assumes that the vegetation does not require as much watering. These changes to the watering schedule are typically insufficient to achieve efficient watering.

More sophisticated irrigation controllers usually include some mechanism for automatically making adjustments to the irrigation run times to account for daily environmental variations. One common adjustment is based on soil moisture. It is common, for example, to place sensors locally in the soil, and suspend irrigation as long as the sensor detects moisture above a given threshold. Controllers of this type help to reduce over irrigating, but placement of the sensors is critical to successful operation.

Still more sophisticated irrigation controllers use evapotranspiration rates for determining the amount of water to be applied to a landscape. Evapotranspiration is the water lost by direct evaporation from the soil and plant and by transpiration from the plant surface. Potential (i.e. estimated) evapotranspiration (ETo) can be calculated from meteorological data collected on-site, or from a similar use. ETo data from meteorological monitoring equipment located on the irrigation site is thought to provide the most efficient irrigating of the landscape, however, monitoring equipment required to obtain the ETo values is very expensive to install and operate. Therefore, most of the data for ETo calculations is gathered from off-site locations that are frequently operated by government agencies. The ETo data is then broadcast by various methods to the irrigation sites. One such system, disclosed in U.S. Pat. No. 4,962,522, issued October 1990, and in U.S. Pat. No. 5,208,855, issued May 1993, both to Marian, transmits ETo values for multiple geographic zones. Irrigation controllers receive and extract appropriate data for the local conditions, and then use the extracted data to calculate run times. Unfortunately, known controllers of this type are notoriously complicated to use, and even systems touting automatic adjustment of irrigation flow still require relatively complicated input. Systems discussed in the U.S. Pat. No. 5,208,855 patent, for example, receive the signal, and update the interval used for preset irrigation control timings rather than determine an entirely new irrigation schedule. Systems discussed in U.S. Pat. No. 5,444, 611 issued August, 1995 to Woytowitz et al., automatically calculate and execute a new schedule, but the new schedule is based upon meteorological data that may not be applicable to the local conditions.

Thus, because of cost and/or complicated operating requirements, most residential and small commercial landscape sites are primarily irrigated by controllers that provide inadequate schedule modification. This results in either too much or too little water being applied to the landscape, which in turn results in both inefficient use of water and unnecessary stress to the plants. Therefore, a need still exists for a cost-effective irrigation system for residential and small commercial landscape sites, which is capable of frequently varying the irrigation schedule based upon estimates of actual water requirements.

SUMMARY OF THE INVENTION

The present invention provides systems and methods in which an irrigation controller uses a regression model to estimate an evapotranspiration rate (estimated ETo), and uses the estimated ETo to affect an irrigation schedule executed by the controller.

The regression model is preferably based upon a comparison of historical ETo values against corresponding historical environmental values, with the data advantageously spanning a time period of at least two days, and more preferably at least one month. Data from multiple environmental factors may also be used.

The environmental factor(s) utilized may advantageously comprise one or more of temperature, solar radiation, wind speed, humidity, barometric pressure, and soil moisture. Values relating the environmental factor(s) may enter the controller from a local sensor, a distal signal source, or both.

Various objects, features, aspects, and advantages of the present invention will become more apparent from the following detailed description of preferred embodiments of the invention, along with the accompanying drawings in which like numerals represent like components.

DETAILED DESCRIPTION

Figure 1:
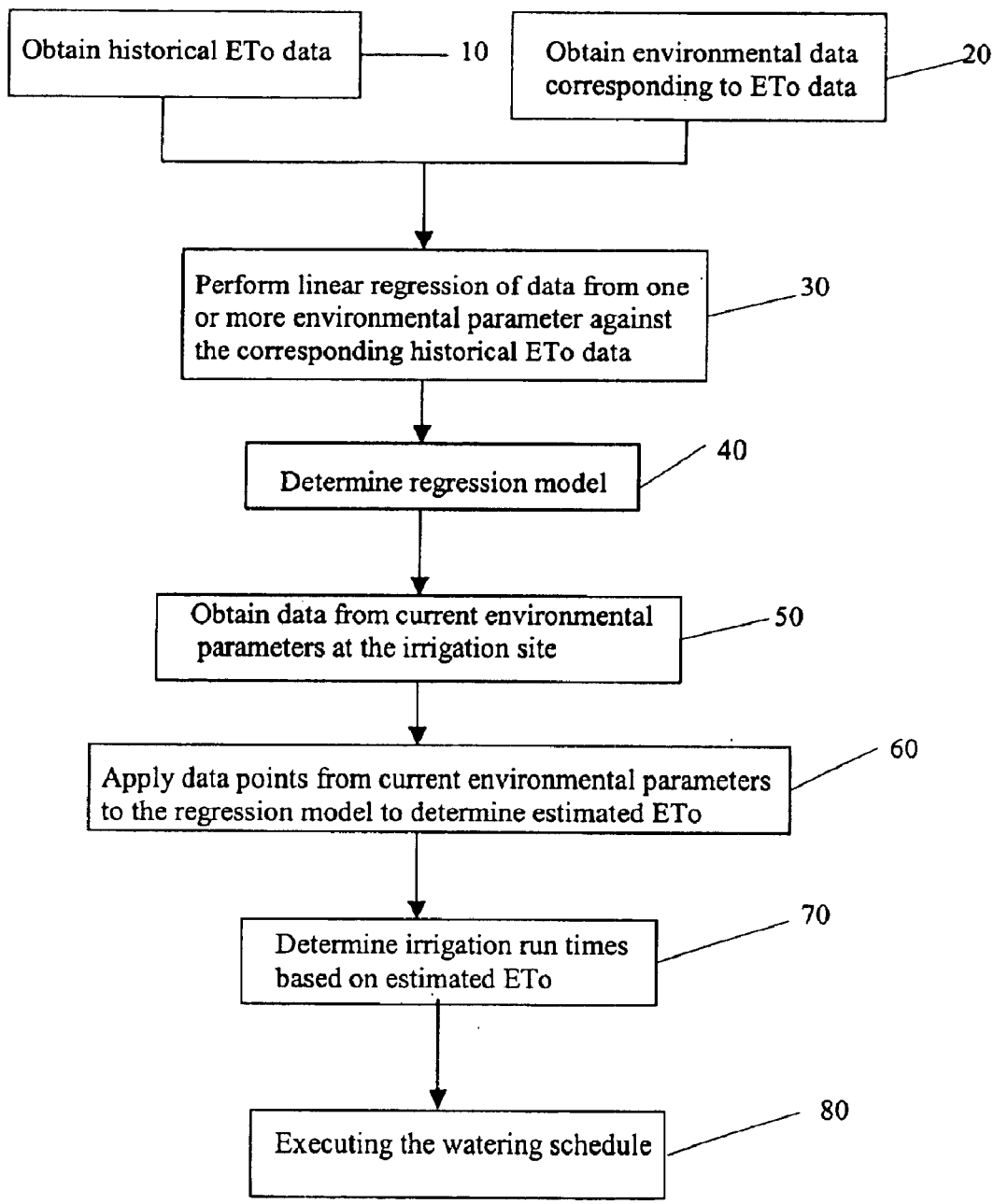
FIG. 1 is a flow chart of a preferred embodiment of the method of the present invention.

In FIG. 1 a method of controlling irrigation run time generally comprises: providing historical ETo values 10; providing corresponding environmental values 20; performing a linear regression for the historical ETo values and the historical environmental values 30; determining a regression model 40; obtaining a current local value for an environmental factor 50; applying that value to the regression model 40 to estimate current ETo 60; using the current ETo to determine the watering schedule 70; and then executing the watering schedule 80.

The historical ETo values may be obtained from a number of sources, including government managed weather stations such as CIMIS (California Irrigation Management Information System, maintained by the California Department of Water Resources), CoAgMet maintained by Colorado State University—Atmospheric Sciences, AZMET maintained by University of Arizona—Soils, Water and Environmental Science Department, New Mexico State University—Agronomy and Horticulture, and Texas A&M University—Agricultural Engineering Department. Although slight variations in the methods used to determine the ETo values do exist, most ETo calculations utilize the following environmental factors: temperature, solar radiation, wind speed, vapor pressure or humidity, and barometric pressure.

Figure 2:
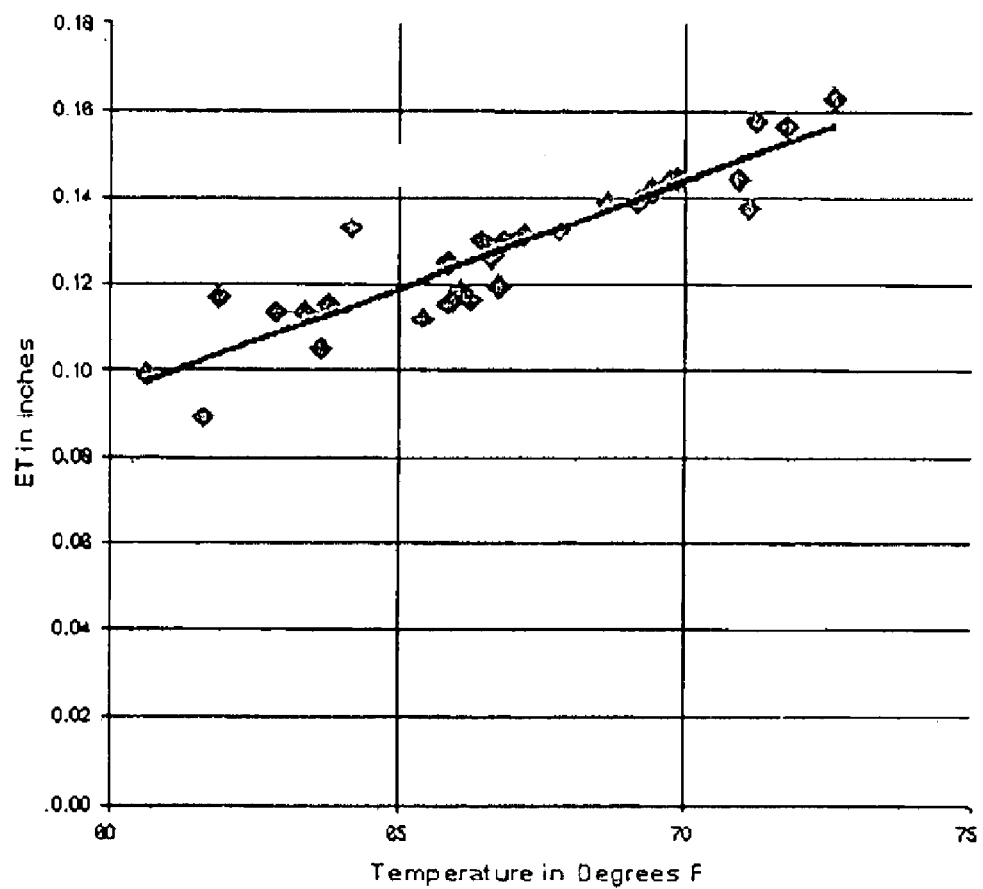
FIG. 2 is a figure showing an exemplary relationship of ETo versus temperature.

FIG. 2 shows an exemplary relationship of temperature versus ETo over a month. An increase in temperature generally results in an increase in the ETo value, with the opposite occurring upon a decrease in temperature. The other factors have greater or lesser effects than temperature on ETo, but all have some effect on ETo, and each of the environmental factors can be used in the determination of a regression model.

Regression analysis can be performed on any suitable time period. Several years of data is preferred, but shorter time spans such as several months, or even a single month, can also be used. Different regression models can also be generated for different seasons during the year, for different geographic zones, and so forth.

Figure 5:
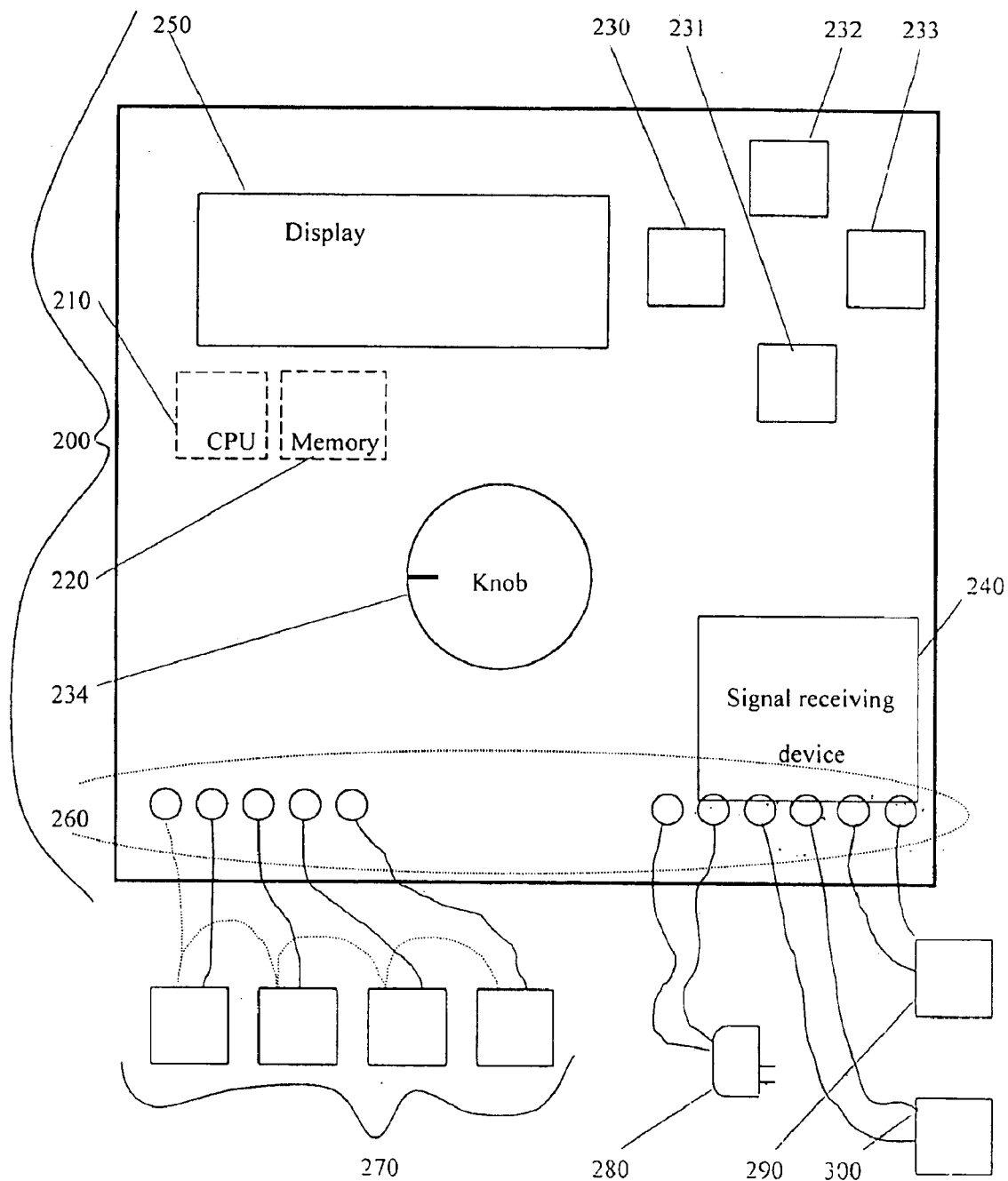
FIG. 5 is a schematic of an irrigation controller.

The regression model is preferably programmed into the central processing unit or memory of the irrigation controller using a suitable assembler language or microcode (See FIG. 5, 210 and 220). The value or values applied against the regression model are preferably obtained from one or more local sensors (see FIG. 6, steps 311 through 316). The microprocessor based central processing unit may have conventional interface hardware for receiving and interpreting of data or signals such sensors.

Figure 3:
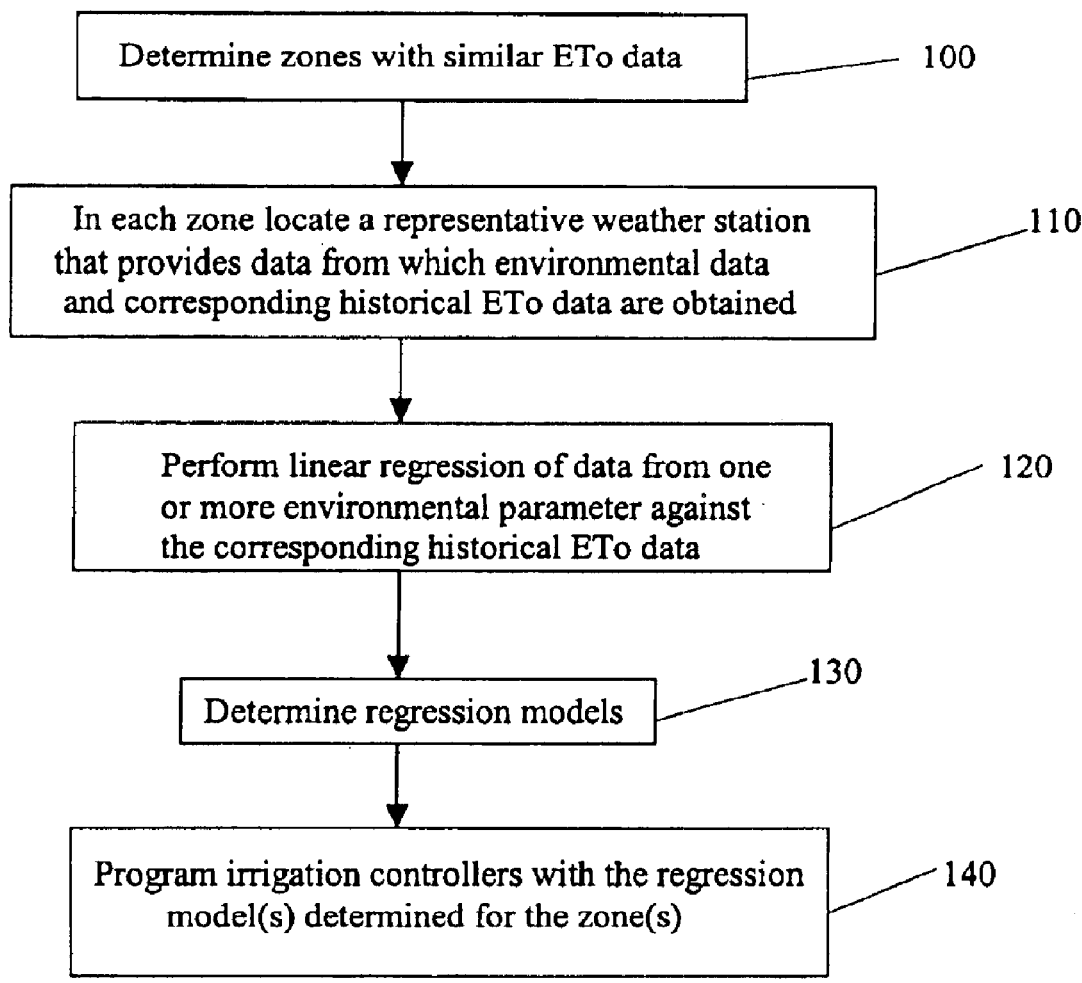
FIG. 3 is a flow chart of the steps in the determination of a regression model which would be programmed in irrigation controllers.

In FIG. 3 the initial step in a preferred determination of a regression model is to select zones with similar evapotranspiration characteristics, step 100. A representative weather station, which provides ETo values, is selected in the zone, step 110. Preferably, monthly linear regression is performed of one or more historical factor(s) against the historical ETo values, step 120. Monthly regression models are determined from these regression relationships, step 130. All irrigation controllers located in a specific zone are then programmed with the regression models determined for that zone, step 140.

Figure 4:
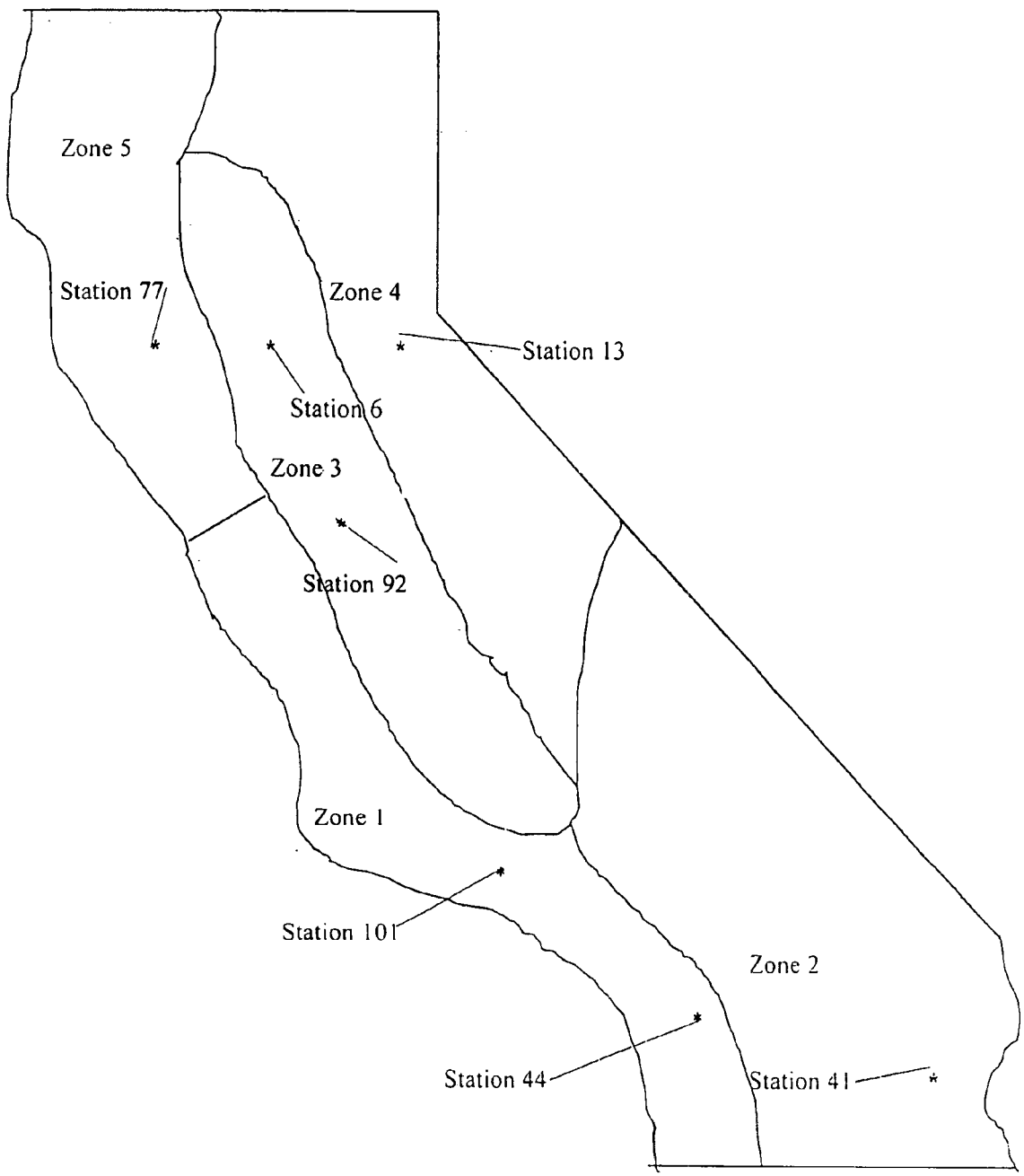
FIG. 4 is a map depicting how California might be divided into zones with similar evapotranspiration characteristics, and the location of a representative weather station within each zone.

FIG. 4 is a map depicting how California might be divided into zones with similar evapotranspiration characteristics, and the location of a representative weather station within each zone.

FIG. 5 is a schematic of an irrigation controller programmed with a regression model that, along with other inputs and/or adjustments, would determine the run times for the various stations controlled by the irrigation controller. A preferred embodiment of an irrigation controller 200 generally includes a microprocessor based central processing unit 210, an on-board memory 220, some manual input devices 230 through 234 (buttons and or knobs), a signal receiving device 240, a display screen 250, a plurality of electrical connectors 260 for connecting with solenoids 270, and a power supply 280. Each of these components by itself is well known in the electronic industry, with the exception of the programming of the microprocessor in accordance with the functionality set forth herein.

Figure 6:
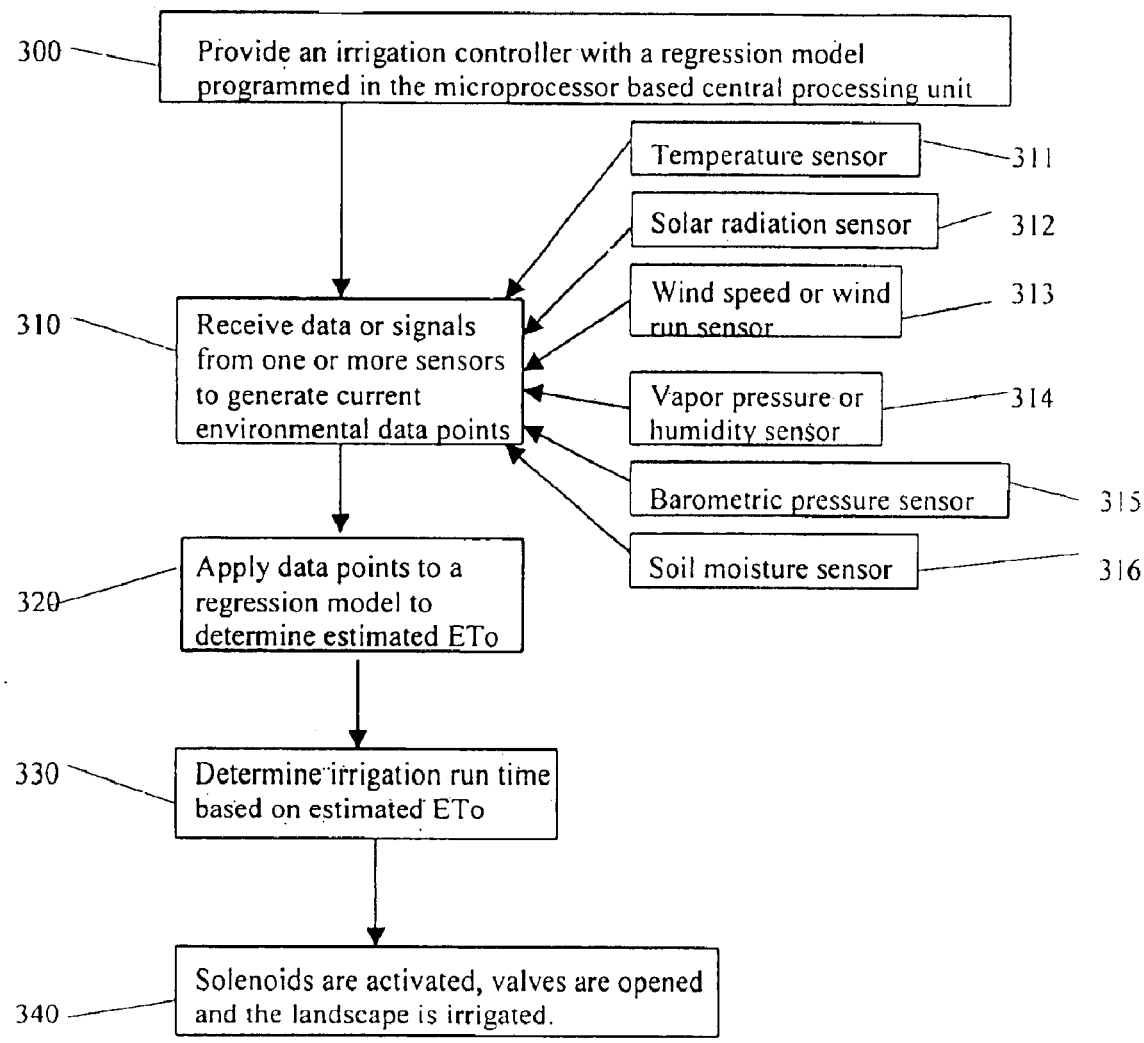
FIG. 6 is a flow chart of an irrigation system according to the present invention.

FIG. 6 is a flow chart of an irrigation system according to the present invention. It starts with step 300 of providing an irrigation controller (See FIG. 5, 200) with a regression model programmed in the microprocessor based central processing unit 200. Step 310 is the receiving of measurements of one or more current environmental factor(s). These measurements are applied to the regression model 320 and the run times are determined by the regression model 330. However, the controller may not activate the valves to irrigate the landscape until an adequate irrigation run time has accumulated to permit for deep watering of the soil (not shown). When an adequate irrigation run time has been accumulated the controller will activate the valves to each station and the landscape will be irrigated 340, except when a manual or automatic override of irrigation occurs.

Figure 7:
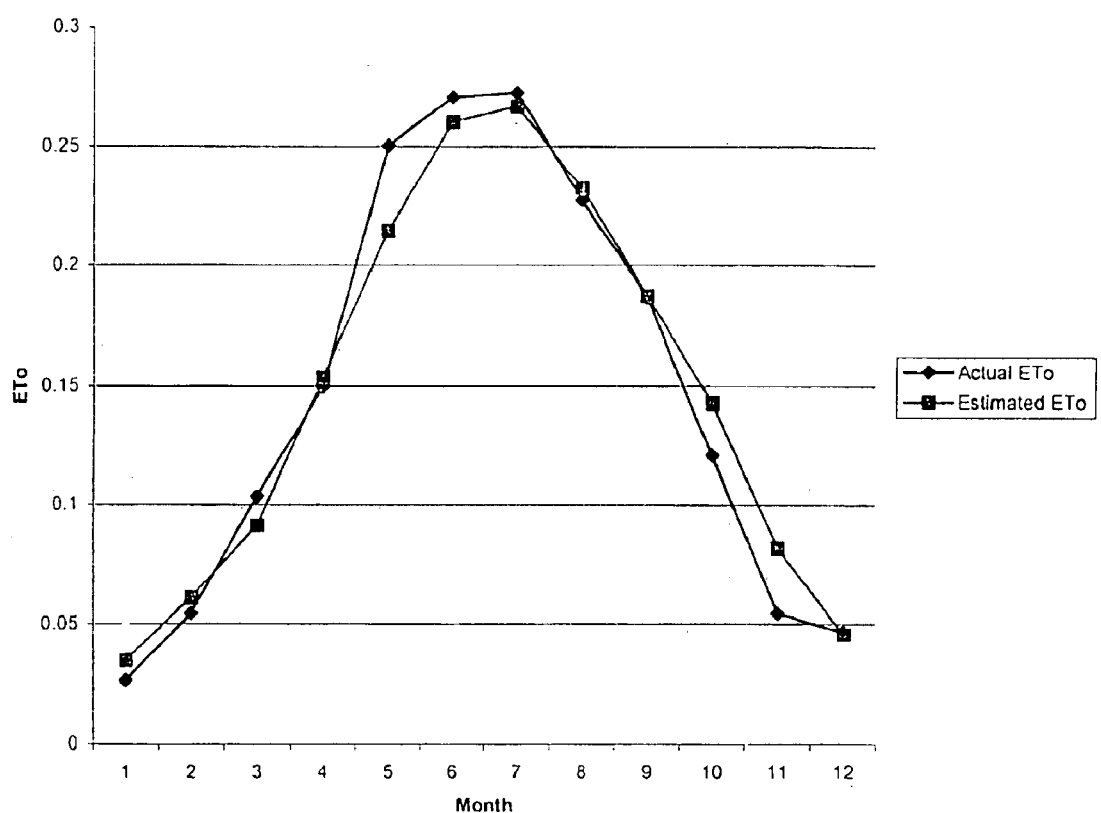
FIG. 7 is a figure showing an exemplary comparison between ETo values determined according to the present invention and actual ETo values for 1999 from a weather station located at Merced, Calif.

FIG. 7 is a comparison between actual ETo values and ETo values determined according to the present invention for 1999 data from a weather station located at Merced, Calif. As the figure indicates, some differences do exist between actual ETo values and ETo values determined by the present invention. However, landscapes at Merced, Calif., receiving irrigation based on the present invention, would receive close to the right amount of water required to maintain the plants in a healthy condition and with a reduced waste of water.

Controllers contemplated herein may, of course, advantageously include features that are not necessarily related to the provisioning or use of optionally sequential/concurrent stations. Among other things, contemplated controllers may employ software that obtains an evapotranspiration rate (ETo) from a distal source as described in pending U.S. application Ser. No. 09/082,603. Contemplated controllers may also employ software that modifies watering patterns based upon a water budge or sensor input as described in pending U.S. application Ser. Nos. 09/478,108 and 60/209,709, respectively. Contemplated controllers may also employ a simplified adjustment mechanism such as a "more/less" button as described in pending U.S. application Ser. No. 09/603,104. The disclosures of each of these applications are incorporated herein by reference in their entirety.

Thus, specific embodiments and applications of irrigation controllers using regression models have been disclosed. It should be apparent, however, to those skilled in the art that many more modifications besides those described are possible without departing from the inventive concepts herein. The inventive subject matter, therefore, is not to be restricted except in the spirit of the appended claims.

What is claimed is:

1. An irrigation controller comprising:
a memory that stores a regression model, wherein the regression model is based upon a set of historical ETo values and a set of corresponding historical values for an environmental factor, the regression model running with optional input from a local sensor;
a microprocessor that applies a current value for the environmental factor to the regression model to calculate a current evapotranspiration rate (estimated ETo), wherein the irrigation controller uses the estimated ETo to determine an irrigation schedule executed by the irrigation controller.

2. The controller of claim 1 wherein the set of historical ETo values spans a time period of at least two days.

3. The controller of claim 1 wherein the regression model is further based upon a second set of historical values for a second environmental factor.

4. The controller of claim 1 wherein the regression model comprises a linear regression.

5. The controller of claim 1 wherein the regression model comprises a multiple regression.

6. The controller of claim 1 wherein the environmental factor is temperature.

7. The controller of claim 1 wherein the environmental factor is solar radiation.

8. The controller of claim 1 wherein the environmental factor is wind speed.

9. The controller of claim 1 wherein the environmental factor is humidity.

10. The controller of claim 1 wherein the environmental factor is barometric pressure.

11. The controller of claim 1 wherein the environmental factor is soil moisture.

12. The controller of claim 1 wherein the environmental factor is selected from a group consisting of temperature, solar radiation, wind speed, humidity, barometric pressure, and soil moisture.

13. An irrigation system comprising an irrigation controller according to claim 1, and said local sensor, which provides a signal corresponding to the value for the environmental factor.

14. An irrigation system comprising an irrigation controller according to claim 1, and a receiver that receives from a distal source a signal corresponding to the value for the environmental factor.

* * * * *